(12) United States Patent
Labarge et al.

(10) Patent No.: US 6,670,296 B2
(45) Date of Patent: Dec. 30, 2003

(54) ALUMINA/ZEOLITE LEAN NOX CATALYST

(75) Inventors: William J. Labarge, Bay City, MI (US); Mark David Hemingway, Columbiaville, MI (US); Joachim Kupe, Davisburgh, MI (US); Galen Bruce Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 25 days.

(21) Appl. No.: 09/758,900

(22) Filed: Jan. 11, 2001

(65) Prior Publication Data

US 2002/0091061 A1 Jul. 11, 2002

(51) Int. Cl.$^7$ .................................. B01J 29/06
(52) U.S. Cl. ............................ 502/69; 502/64
(58) Field of Search .................. 502/340, 341, 502/344, 64, 71, 72, 69, 79; 423/213.2, 239.1, 239.2

(56) References Cited

U.S. PATENT DOCUMENTS

| | | | |
|---|---|---|---|
| 4,091,076 A | | 5/1978 | Vogel et al. |
| 4,212,771 A | | 7/1980 | Hamner |
| 4,639,259 A | | 1/1987 | Pearson |
| 4,762,537 A | | 8/1988 | Fleming et al. |
| 4,919,905 A | * | 4/1990 | Horaguchi et al. ...... 423/239.1 |
| 4,977,124 A | | 12/1990 | Smith |
| 5,116,586 A | * | 5/1992 | Baacke et al. ............ 423/239 |
| 5,149,435 A | * | 9/1992 | Laube ........................ 210/651 |
| 5,153,165 A | | 10/1992 | Lowery et al. |
| 5,312,608 A | | 5/1994 | Hayasaka et al. |
| 5,500,198 A | | 3/1996 | Liu et al. |
| 5,559,073 A | | 9/1996 | Hu et al. |
| 5,727,385 A | | 3/1998 | Hepburn |
| 5,849,254 A | * | 12/1998 | Suzuki et al. ............. 423/213.5 |
| 5,879,645 A | | 3/1999 | Park et al. |
| 5,884,473 A | | 3/1999 | Noda et al. |
| 5,906,958 A | | 5/1999 | Park et al. |
| 5,948,376 A | * | 9/1999 | Miyoshi et al. .......... 423/213.5 |
| 5,990,038 A | | 11/1999 | Suga et al. |
| 5,997,830 A | * | 12/1999 | Itoh et al. ................ 423/213.5 |
| 6,025,297 A | | 2/2000 | Ogura et al. |
| 6,043,189 A | | 3/2000 | Narbeshuber et al. |
| 6,184,167 B1 | * | 2/2001 | Van Mao et al. ............. 502/64 |

FOREIGN PATENT DOCUMENTS

| | | |
|---|---|---|
| EP | 0 852 966 A1 | 7/1998 |
| EP | 0 899 002 A2 | 3/1999 |
| EP | 1 008 378 A1 | 6/2000 |
| EP | 1 026 374 A2 | 8/2000 |
| JP | 56002848 A | 1/1981 |
| JP | 2293050 A | 12/1990 |
| JP | 3267151 A | 11/1991 |
| JP | 4338233 A | 11/1992 |
| JP | 4367707 A | 12/1992 |
| JP | 5031367 A | 2/1993 |
| JP | 5192535 A | 8/1993 |
| JP | 5277376 A | 10/1993 |
| JP | 6226052 A | 8/1994 |
| JP | 7100386 A | 4/1995 |
| JP | 7116519 A | 5/1995 |
| JP | 7136518 A | 5/1995 |
| JP | 7328440 AA | 12/1995 |
| JP | 8010573 A | 1/1996 |
| JP | 8038888 A | 2/1996 |
| JP | 8038889 A | 2/1996 |
| JP | 8155303 A | 6/1996 |
| JP | 8229355 A | 9/1996 |
| JP | 8281110 A | 10/1996 |
| JP | 9103652 A | 4/1997 |
| JP | 9155185 A | 6/1997 |
| JP | 9225264 A | 9/1997 |
| JP | 9239276 A | 9/1997 |
| JP | 9248462 A | 9/1997 |
| JP | 9253453 A | 9/1997 |
| JP | 10057811 A | 3/1998 |
| JP | 10118457 A | 5/1998 |
| JP | 10118486 A | 5/1998 |
| JP | 10128114 A | 5/1998 |
| JP | 10165819 A | 6/1998 |
| JP | 10192713 A | 7/1998 |
| JP | 10290933 A | 11/1998 |
| JP | 11057477 A | 3/1999 |
| JP | 11169670 A | 6/1999 |
| JP | 11207190 A | 8/1999 |
| JP | 11221466 A | 8/1999 |
| JP | 11226404 A | 8/1999 |

OTHER PUBLICATIONS

Rogert Grant, Claire Grant; Chemical Dictionary (Oct. 23, 1990); McGraw–Hill Book Company, 5$^{th}$ edition, p. 364.*

* cited by examiner

*Primary Examiner*—Stanley S. Silverman
*Assistant Examiner*—Edward M. Johnson
(74) *Attorney, Agent, or Firm*—Jimmy L. Funke

(57) ABSTRACT

A $NO_x$ catalyst combination for treating a lean exhaust gas stream comprising an alkaline earth-alumina catalyst and an alkaline earth-zeolite catalyst, arranged on a substrate such that the gas stream first contacts the alkaline earth-alumina catalyst prior to contacting the alkaline earth-zeolite catalyst.

19 Claims, No Drawings

ALUMINA/ZEOLITE LEAN NOX CATALYST

BACKGROUND OF THE INVENTION

The present invention relates to a catalyst for purifying exhaust gases from an internal combustion engine. In particular, it relates to a lean $NO_x$ catalyst.

It is well known in the art to use catalyst compositions, including those commonly referred to as three-way conversion catalysts ("TWC catalysts") to treat the exhaust gases of internal combustion engines. Such catalysts, containing precious metals like platinum, palladium, and rhodium, have been found both to successfully promote the oxidation of unburned hydrocarbons (HC) and carbon monoxide (CO) and to promote the reduction of nitrogen oxides ($NO_x$) in exhaust gas, provided that the engine is operated around balanced stoichiometry for combustion ("combustion stoichiometry"; i.e., between about 14.7 and 14.4 air/fuel (A/F) ratio).

However, fuel economy and global carbon dioxide ($CO_2$) emissions have made it desirable to operate engines under lean-burn conditions, where the air-to-fuel ratio is somewhat greater than combustion stoichiometry to realize a benefit in fuel economy. Diesel and lean-burn gasoline engines generally operate under highly oxidizing conditions (i.e., using much more air than is necessary to burn the fuel), typically at air/fuel ratios greater than 14.7 and generally between 19 and 35. Under these highly lean conditions, typical three-way catalysts exhibit little activity toward $NO_x$ reduction, as their reduction activity is suppressed by the presence of excess oxygen.

The control of $NO_x$ emissions from vehicles is a worldwide environmental problem. Lean-burn, high air-to-fuel ratio, and diesel engines are certain to become more important in meeting the mandated fuel economy requirements of next-generation vehicles. Development of an effective and durable catalyst for controlling NOx emissions under net oxidizing conditions accordingly is critical.

Recently, copper-ion exchanged zeolite catalysts have been shown to be active for selective reduction of $NO_x$ by hydrocarbons in the presence of excess oxygen. Platinum-ion exchanged zeolite catalyst is also known to be active for $NO_x$ reduction by hydrocarbons under lean conditions. However, this catalytic activity is significant only in a narrow temperature range around the lightoff temperature of hydrocarbon oxidation. All the known lean-$NO_x$ catalysts reported in the literature tend to lose their catalytic activity for $NO_x$ reduction when the catalyst temperature reaches well above the lightoff temperature of hydrocarbon oxidation. This narrow temperature window of the lean-$NO_x$ catalysts is considered to be one of the major technical obstacles, because it makes practical application of these catalysts difficult for lean-burn gasoline or diesel engines. As an example, the Cu-zeolite catalysts deactivate irreversibly if a certain temperature is exceeded. Catalyst deactivation is accelerated by the presence of water vapor in the stream and water vapor suppresses the NO reduction activity even at lower temperatures. Also, sulfate formation at active catalyst sites and on catalyst support materials causes deactivation. Practical lean-$NO_x$ catalysts must overcome all three problems simultaneously before they can be considered for commercial use. In the case of sulfur poisoning, some gasoline can contain up to 1200 ppm of organo-sulfur compounds. Lean-$NO_x$ catalysts promote the conversion of such compounds to $SO_2$ and $SO_3$ during combustion. Such $SO_2$ will adsorb onto the precious metal sites at temperatures below 300° C. and thereby inhibits the catalytic conversions of CO, $C_xH_y$(hydrocarbons) and $NO_x$. At higher temperatures with an $Al_2O_3$ catalyst carrier, $SO_2$ is converted to $SO_3$ to form a large-volume, low-density material, $Al_2(SO_4)_3$, that alters the catalyst surface area and leads to deactivation. In the prior art, the primary solution to this problem has been to use fuels with low sulfur contents.

Another alternative is to use catalysts that selectively reduce $NO_x$ in the presence of a co-reductant, e.g., selective catalytic reduction (SCR) using ammonia or urea as a co-reductant. Selective catalytic reduction is based on the reaction of NO with hydrocarbon species activated on the catalyst surface and the subsequent reduction of $NO_x$ to $N_2$. More than fifty such SCR catalysts are conventionally known to exist. These include a wide assortment of catalysts, some containing base metals or precious metals that provide high activity. Unfortunately, just solving the problem of catalyst activity in an oxygen-rich environment is not enough for practical applications. Like most heterogeneous catalytic processes, the SCR process is susceptible to chemical and/or thermal deactivation. Many lean-$NO_x$ catalysts are too susceptible to high temperatures, water vapor and sulfur poisoning (from $SO_x$).

Yet another viable alternative involves using co-existing hydrocarbons in the exhaust of mobile lean-burn gasoline engines as a co-reductant and is a more practical, cost-effective, and environmentally sound approach. The search for effective and durable non-selective catalytic reduction "NSCR" catalysts that work with hydrocarbon co-reductant in oxygen-rich environments is a high-priority issue in emissions control and the subject of intense investigations by automobile and catalyst companies, and universities, throughout the world.

A leading catalytic technology for removal of $NO_x$ from leanburn engine exhausts involves $NO_x$ storage reduction catalysis, commonly called the "lean-$NO_x$ trap". The lean-$NO_x$ trap technology can involve the catalytic oxidation of NO to $NO_2$ by catalytic metal components effective for such oxidation, such as precious metals. However, in the lean $NO_x$ trap, the formation of $NO_2$ is followed by the formation of a nitrate when the $NO_2$ is adsorbed onto the catalyst surface. The $NO_2$ is thus "trapped", i.e., stored, on the catalyst surface in the nitrate form and subsequently decomposed by periodically operating the system under stoiciometrically fuel-rich combustion conditions that effect a reduction of the released $NO_x$ (nitrate) to $N_2$.

The lean-$NO_x$-trap technology has been limited to use for low sulfur fuels because catalysts that are active for converting NO to $NO_2$ are also active in converting $SO_2$ to $SO_3$. Lean $NO_x$ trap catalysts have shown serious deactivation in the presence of $SO_x$ because, under oxygen-rich conditions, $SO_x$ adsorbs more strongly on $NO_2$ adsorption sites than $NO_2$, and the adsorbed $SO_x$ does not desorb altogether even under fuel-rich conditions. Such presence of $SO_3$ leads to the formation of sulfuric acid and sulfates that increase the particulates in the exhaust and poison the active sites on the catalyst. Attempts with limited success to solve such a problem have encompassed the use of selective $SO_x$ adsorbents upstream of lean $NO_x$ trap adsorbents. Furthermore, catalytic oxidation of NO to $NO_2$ is limited in its temperature range. Oxidation of NO to $NO_2$ by a conventional Pt-based catalyst maximizes at about 250° C. and loses its efficiency below about 100 degrees and above about 400 degrees. Thus, the search continues in the development of systems that improve lean $NO_x$ trap technology with respect to temperature and sulfur considerations.

Another $NO_x$ removal technique comprises a non-thermal plasma gas treatment of NO to produce $NO_2$ which is then combined with catalytic storage reduction treatment, e.g., a lean $NO_x$ trap, to enhance $NO_x$ reduction in oxygen-rich vehicle engine exhausts. In the lean $NO_x$ trap, the $NO_2$ from the plasma treatment is adsorbed on a nitrate-forming material, such as an alkali material, and stored as a nitrate. An engine controller periodically runs a brief fuel-rich condition to provide hydrocarbons for a reaction that decomposes the stored nitrate into benign products such as $N_2$. By using a plasma, the lean $NO_x$ trap catalyst can be implemented with known $NO_x$ adsorbers, and the catalyst may contain less or essentially no precious metals, such as Pt, Pd and Rh, for reduction of the nitrate to $N_2$. Accordingly, an advantage is that a method for $NO_x$ emission reduction is provided that is inexpensive and reliable. The plasma-assisted lean $NO_x$ trap can allow the life of precious metal lean $NO_x$ trap catalysts to be extended for relatively inexpensive compliance to $NO_x$ emission reduction laws. Furthermore, not only does the plasma-assisted lean $NO_x$ trap process improve the activity, durability, and temperature window of lean $NO_x$ trap catalysts, but it allows the combustion of fuels containing relatively high sulfur contents with a concomitant reduction of $NO_x$, particularly in an oxygen-rich vehicular environment. What is needed in the art is an exhaust gas catalyst system having improved durability, as well as effective $NO_x$ management, over extended operating time. The present invention overcomes many of the shortcomings of the prior art.

SUMMARY OF THE INVENTION

A $NO_x$ catalyst structure typically includes 2 parts: a matrix support and an active catalyst component. The matrix is the backbone that allows the gasses to flow easily through the entire catalyst bed. The matrix generally consists of large particles with large pores; the active catalysts generally are much smaller particles and have much smaller pore sizes.

Diesel engines and engines that are lean burn usually operate in the range of 150° C. to about 350° C. Barium alumina typically has $NO_x$ to $N_2$ conversions of ~40% at 300° C., ~80% at 350° C. and ~40% at 400° C. Barium zeolite typically has $NO_x$ to $N_2$ conversion of ~40% at 175° C., ~70 at 250° C. and ~40% at 350° C. As a vehicle warms to 150° C., 100% of the $N_2$ is formed on the barium zeolite. As the temperature increases to 250° C., 60% of the $N_2$ formed is on barium zeolite and 40% is on barium-alumina. As the temperature increases further to 350° C., 80% of the $N_2$ is formed on the barium-alumina and only 20% of the $N_2$ is formed on the barium-zeolite.

Now, according to the present invention, a lean $NO_x$ catalyst is provided for use in a non-thermal plasma exhaust gas treatment system. The presently invented catalyst comprises a combination of an alkaline earth-zeolite catalyst with an alkaline earth-alumina catalyst.

The alumina catalyst preferably comprises coarse aluminum oxide particles are having an average size ranging from about 10 to about 30 microns. The zeolite catalyst preferably comprises zeolite particles having an average size ranging from about 0.1 to about 0.3 microns. In an admixture of the alumina catalyst and the zeolite catalyst, the fine zeolites tend to fill in the void spaces around the coarse alumina particles. The small zeolites particles are densely packed. Exhaust does not flow easily through the dense packed zeolites. The aluminum oxide particles are mostly porous. Gasses can easily pass through the aluminum oxide particles to reach the zeolite particles.

The aluminum oxide particles providing the admixture matrix generally comprise agglomerations of small psuedocrystalline alumina particles typically of about 0.3 microns or less. The agglomerations preferably are larger than about 10 microns and less than about 30 microns. The alumina matrix is mixed with a Ba-zeolite catalyst component, typically featuring a particulate size ranging from about 0.1 to about 0.3 microns. In general, the smaller the zeolite particle, the more hydrothermally stable the zeolite becomes, thereby improving its long term activity. Preferably, pursuant to the invention, the zeolite active catalysts are dispersed throughout the alumina matrix.

When the catalyst structure is disposed as an exhaust gas treatment catalyst, large gaseous molecular materials are enabled to enter the large pores of the alumina matrix without plugging the small pores of the zeolite catalyst. The large gaseous molecular materials are decomposed through action of the alumina matrix to small fractions, whereby the small fractions then are able to enter the micropores of the active zeolite catalysts. Large heteroatoms, such as sulfur and nitrogen, remain are adsorbed onto and remain on the reactive alumina matrix surface, such that the more active zeolite is not neutralized or poisoned by these heteroatoms and accordingly remains highly active. The matrix of alumina further is especially reactive to and can trap deposited metals such as nickel. Poisons will deposit on the first high surface area material that they are exposed to. SEM of engine aged catalysts show poison deposition throughout the large aluminum oxide particles. The zeolite particles show little poison deposition. This demonstrates that exhaust flows through the aluminum oxide before reaching the zeolite.

The above-described and other features and advantages of the present invention will be appreciated and understood by those skilled in the art from the following detailed description, and appended claims.

DESCRIPTION OF PREFERRED EMBODIMENTS

The catalyst of the present invention preferably comprises a barium alumina fraction in a proportion ranging from about 30 wt % to about 50 wt %, and a barium zeolite fraction in a proportion ranging from about 50 wt % to about 70 wt %. A particularly preferred admixture comprises a barium alumina fraction in a proportion ranging from about 35 wt % to about 45 wt %, and a barium zeolite fraction in a proportion ranging from about 55 wt % to about 65 wt %. Inclusion of an alkaline binder in the admixture is preferred to prevent agglomerated alumina particles being broken down into primary aggregates.

As described above, the aluminum oxide particles generally are agglomerates of about 0.3 micron or less aluminum oxide grains. If low pH aluminum compounds are used as binders, the aluminum oxide agglomerates tend to be broken down to the primary particles. If that happens, for example, a mixture of about 0.3 micron aluminum oxide and about 0.3 micron zeolite would result. The washcoat from such a mixture would be densely packed. This type of washcoat would be easily poisoned and diffusion limited at the surface.

Preferably, high pH aluminum compounds are used as binders. Using such binders, the aluminum oxide agglomerates appear stable and maintain their integrity as about 10 to 30 micron particles. A mixture, for example, of such 10–30 micron alumina particles and 0.3 micron particles provides a preferred washcoat. Accordingly, a binder comprising an alkaline aluminum, such as a barium aluminum hydroxide or an ammonium aluminum hydroxide is preferred. An ammonium aluminum hydroxide is particularly preferred. When calcined, it is preferred that the ammonium aluminum hydroxide should provide at least about 2 wt % of the washcoat mass. Inclusion of an ammonium aluminum hydroxide binder that provides at least about 4 wt % washcoat mass is more preferred, and about 6 wt % washcoat mass is particularly preferred.

Any alkaline earth element may be used as the active catalyst. For example, the active catalyst element may comprise calcium, strontium, and/or barium. The use of barium is particularly preferred. Tests have indicated that calcium-doped catalysts generally convert about 30% $NO_x$ to $N_2$; strontium-doped catalysts generally convert about 50% $NO_x$ to $N_2$; barium-doped catalysts generally convert about 70% $NO_x$ to $N_2$. Based on a desire in the industry to optimize conversion of $NO_x$ to $N_2$ at about 90% or better, barium is the particularly preferred occluding catalyst material.

Accordingly, Ba is the preferred occluding catalyst for both the zeolite and the alumina components of the present catalyst. The alumina matrix features enhanced trapping efficiency if it is doped with a material such as barium. In specific, nitrogen species can neutralize catalytically active sites. Barium is the most robust alkaline earth element for resistance to nitrogen poisoning. The alumina matrix provides sacrificial sites for nitrogen poisoning, thus precluding large polycyclic nitrogen compounds from entering and poisoning the small pores of the zeolite catalyst component.

The zeolite catalyst component preferably comprises a barium content of about 18 wt % to about 36 wt %; about 24 wt % to about 30 wt % is particularly preferred. Any type zeolite may be used; preferred zeolites include X type zeolite, Y type zeolite, and/or ZSM-5 type zeolite. A Y type zeolite is particularly preferred. A zeolite surface area of at least about 300 m²/gram is preferred, at least about 400 m²/g is more preferred, and a surface area of at least about 500 m²/g is particularly preferred. The preferred zeolite average particle size is less than about 0.9 microns; more preferred are zeolite particles of an average size less than about 0.6 microns; and particularly preferred are zeolites having an average particle size less than about 0.3 microns. The zeolite particles preferably feature average pore sizes ranging from about 4 to about 10 angstroms ("A"), with average pore sizes ranging from about 7 to 8. A particularly preferred. It is preferred to stabilize the zeolite catalyst with the inclusion of a rare earth element. Inclusion of a lanthanum oxide stabilizer is particularly preferred. Preferably, the zeolite has a silica to alumina ratio of at least about 2; a ratio of at least about 4 is more preferred; and, a ratio of at least about 7 is particularly preferred.

A ZSM-5 zeolite with pores of about 4 to 5 A is preferred and a lanthanum stabilized X zeolite is more preferred and a Y-type zeolite with pores of about 7 to 8 A is greatly preferred and a rare earth stabilized Y-type zeolite is especially preferred. Lanthanum oxide is the rare earth stabilizer of choice.

The alumina matrix catalyst component preferably has a barium content of at least about 14 wt %; at least about 21 wt % is more preferred; and, at least about 28 wt % is particularly preferred. Exhaust deposits of oil derived "glassy" compounds such as calcium phosphate and zinc phosphate can greatly reduce diffusion. High levels of alkaline earths, such as barium, prevent formation of these diffusion limiting barriers.

Preferably, the alumina has a surface area of at least about 150 m²/gram; a surface area of at least about 200 m²/g is more preferred; and, a surface area of at least about 250 m²/g is particularly preferred. An average alumina pore size of at least about 40 A is preferred; a pore size of at least about 60 A is more preferred; and, a pore size of at least about 80 A is particularly preferred. Specific acidity ranging from about 50 mmoles (millimoles) n-butylamine/m²×10⁻⁴ to about 500 mmoles n-butylamine/m²×10⁻⁴ is preferred; a specific acidity of about 350 mmoles n-butlyamine/m²×10⁻⁴ is particularly preferred.

Suitable barium sources for preparation of a barium-alumina component include barium nitrate, barium acetate, barium hydroxide, barium ethoxide, barium isopropoxide, and/or barium 2-ethylhexanoate. Barium acetate, barium isopropoxide, and barium 2-ethylhexanoate are preferred. Barium 2-ethylhexanoate is particularly preferred.

Suitable aluminum sources are aluminum oxide, aluminum hydroxide (AlOOH) boehmite and pseudoboehmite, aluminum methoxide, aluminum n-butoxide, aluminum ethoxide, and/or aluminum isopropoxide. Aluminum isopropoxide, aluminum oxide, and aluminum hydroxide are preferred. Aluminum hydroxide is particularly preferred.

The surface acidity of the alumina may be increased by the addition of silica. Suitable silica stabilized aluminas include Condea Vista's SIRAL 5 with 5 wt % silica, SIRAL 10 with 10 wt % silica, SIRAL 20 with 20 wt % silica, SIRAL 30 with 30 wt % silica, and/or SIRAL 40 with 40 wt % silica. SIRAL 30, SIRAL 20, and SIRAL 10 are preferred. SIRAL 10 is particularly preferred.

The alumina preferably includes additional doping ions, such as $M^{+3}$ cations. Lanthanum, yttrium, and/or scandium are the preferred dopants; scandium is particularly preferred. A doping level of less than about 3 wt % is preferred; less than about 2 wt % is more preferred; and, about 1 wt % is particularly preferred. Suitable doping reagents include lanthanum 2-ethylhexanoate, yttrium 2-ethylhexanoate, and scandium 2ethylhexanoate.

The following examples are provided to further describe the invention. The examples are intended to be illustrative in nature and are not to be construed as limiting the scope of the invention.

EXAMPLE I

Preparation of a Ba-Zeolite Component.

Y-Zeolite with a silica to alumina ratio of 7, is mixed with a saturated barium-nitrate solution and heated to 80° C. for 4 hours. The solids are filtered then washed then calcined at 740° C. for 2 hours. The process is repeated at least 2 more times. The resulting material has barium occupying sites that had contained sodium.

EXAMPLE II

Preparation of a Ba-Alumina Component 1000 grams of Condea Vista pseudoboehmite alumina is dispersed in 1500 grams ethanol. 1000 grams of 18 wt % barium 2-ethylhexanote in toluene is mixed into the alumina ethanol mixture. The mixture is dried then calcined at 500° C. The calcined barium alumina is screened to less than 30 micron. The portion greater than 10 micron and less than 30 micron is used in the catalyst.

EXAMPLE III

Preparation of a Ba-Alumina Component 1000 grams of Condea Vista pseudoboehmite alumina is dispersed in 1500 grams ethanol. 1000 grams of 18 wt % barium 2-ethylhexanote in toluene and 100 grams of 12 wt % scandium 2-ethylhexanote in toluene is mixed into the alumina ethanol mixture. The mixture is dried then calcined at 500° C. The calcined barium alumina is screened to less than 30 micron. The portion greater than 10 micron and less than 30 micron is used in the catalyst.

EXAMPLE IV
Preparation of a Ba-Alumina Component 1000 grams of Condea Vista SIRAL 10 silica-alumina is dispersed in 1500 grams ethanol. 1000 grams of 18 wt % barium 2-ethylhexanote in toluene is mixed into the alumina ethanol mixture. The mixture is dried then calcined at 500° C. The calcined barium alumina is screened to less than 30 micron. The portion greater than 10 micron and less than 30 micron is used in the catalyst.

EXAMPLE V
Preparation of an Alumina/Zeolite Catalyst 700 grams barium-doped zeolite, prepared as in Example I, 300 grams barium-aluminum oxide, prepared as in Example II, and 240 grams of Condea Vista disperal Al 25/5 ammonium aluminum hydroxide sol at 25 wt % solids are mixed with 1000 grams water. The resulting slurry is coated on a 600 cell/in3 cordierite monolith and calcined to 500° C. for 4 hours. The calcined washcoat weight is targeted to 4.0 g/in3.

EXAMPLE VI
Preparation of an Alumina/Zeolite Catalyst

A catalyst of the present invention with a coarse alumina layer over a fine zeolite layer is prepared by first coating a 600 cell/in3 cordierite monolith with 2.5 g/in3 of barium-zeolite. A second layer of 1.5 g/in3 of 10–30 micron aluminum oxide then is applied.

COMPARATIVE EXAMPLE VII
Preparation of a Zeolite/Alumina Catlyst

A comparative with a fine zeolite layer over a coarse alumina layer is prepared by first coating a 600 cell/in3 cordierite monolith with 1.5 g/in3 of 10–30 micron aluminum oxide. A second layer of 2.5 g/in3 of barium-zeolite then is applied.

Using the catalysts of Example V and Example VI, the exhaust gas had to first pass through the aluminum oxide catalyst material before it could reach the zeolite NOx occluding catalyst. This test demonstrated an increase in $NO_x$ to $N_2$ conversion over 8% as compared to a baseline catalyst of pure zeolite. In comparison, the catalyst also was tested, as prepared according to Comparative Example VII, with a fine zeolite layer over a coarse alumina layer. In this arrangement, the exhaust gas passed through the zeolite NOx occluding catalyst layer before reaching the aluminum oxide layer. Resulting performance showed 0% increase over the baseline catalyst of pure zeolite.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

We claim:

1. A non-precious metal $NO_x$ catalyst combination for treating a lean exhaust gas stream comprising;
   an admixture of an alkaline earth-alumina having an average particle size ranging from about 10 to about 30 microns, and an alkaline earth-zeolite having an average particle size ranging from about 0.1 to about 0.3 microns; and
   wherein the alkaline earth-alumina catalyst and the alkaline earth-zeolite catalyst are arranged on a substrate such that the gas stream first contacts the alkaline earth-alumina catalyst prior to contacting the alkaline earth-zeolite catalyst, wherein no precious metals are present in the catalyst.

2. The $NO_x$ catalyst of claim 1 wherein the alumina catalyst and the zeolite catalyst include an alkaline earth element selected from the group consisting of Ca, Sr, Ba, and mixtures thereof.

3. The $NO_x$ catalyst of claim 2 wherein the alkaline earth element is Ba.

4. The $NO_x$ catalyst of claim 1 wherein the barium alumina comprises at least about 14 weight percent barium.

5. The $NO_x$ catalyst of claim 4 wherein the barium alumina comprise at least about 28% weight percent barium.

6. The $NO_x$ catalyst of claim 1 wherein the alumina comprise a surface area of at least about 150 $m^2/g$.

7. The $NO_x$ catalyst of claim 1 wherein the barium zeolite comprises about 18 to 36 weight percent barium.

8. The $NO_x$ catalyst of claim 7 wherein the barium zeolite comprises about 24 to 30 weight percent barium.

9. The $NO_x$ catalyst of claim 1 wherein the zeolite has an average particle size less than about 0.9 microns.

10. The $NO_x$ catalyst of claim 1 wherein the admixture includes an alkaline binder.

11. The $NO_x$ catalyst of claim 10 wherein said alkaline binder is an ammonium aluminum hydroxide.

12. A nom-precious metal lean $NO_x$ catalyst admixture comprising:
   an agglomerated barium alumina having an average particle size ranging from about 10 to 30 microns, a barium content of at least about 28 weight percent, a surface area of at least about 250 $m^2/g$, and average pore sizes of at least about 80 angstroms; and
   a barium Y zeolite having a barium content of about 24 to 30 weight percent, a surface area of at least about 500 $m^2/g$, an average particle size ranging from about 0.1 to about 0.3 microns, and average pore sizes ranging from about 7 to 8 angstroms;
   wherein the barium alumina proportion ranges from about 35 to 45 weight percent and the barium Y zeolite proportion ranges from about 55 to 65 weight percent.

13. Th $NO_x$ catalyst of claim 12 wherein the zeolite includes a stabilizer comprising a rare earth element.

14. The $NO_x$ catalyst of claim 12 wherein the alumina includes a doping ion selected from the group consisting of lanthanum, yttrium, scandium, and mixtures thereof.

15. A non-precious metal $NO_x$ catalyst combination for treating a lean exhaust gas stream comprising an alkaline earth-alumina catalyst and an alkaline earth-zeolite catalyst arranged on a substrate such that the gas stream first contacts the alkaline earth-alumina catalyst prior to contacting the alkaline earth-zeolite catalyst; wherein the catalyst combination comprises an admixture of an alkaline earth-alumina having an avenge particle size ranging from about 10 to about 30 microns, and an alkaline earth-zeolite having an average particle size ranging from about 0.1 to about 0.3 microns, and wherein the catalyst composition comprises an admixture of barium alumina in a proportion ranging from about 35 to 45 weight percent, and barium zeolite in a proportion ranging from about 55 to 65 weight percent.

16. A non-precious metal $NO_x$ catalyst combination for treating a lean exhaust gas stream comprising an alkaline earth-alumina catalyst and an alkaline earth-zeolite catalyst arranged on a substrate such that the gas stream first contacts the alkaline earth-alumina catalyst prior to contacting the alkaline earth-zeolite catalyst; wherein the catalyst combination comprises an admixture of an alkaline earth-alumina having an average particle size ranging from about 10 to about 30 microns, and an alkaline earth-zeolite having an average particle size ranging from about 0.1 to about 0.3 microns, and wherein the alumina comprises pores having an average size of at least about 40 Angstroms.

17. A non-precious metal $NO_x$ catalyst combination for treating a lean exhaust gas stream comprising an alkaline earth-alumina catalyst and an alkaline earth-zeolite catalyst arranged on a substrate such that the gas stream first contacts the alkaline earth-alumina catalyst prior to contacting the alkaline earth-zeolite catalyst; wherein the catalyst combination comprises an admixture of an alkaline earth-alumina having an average particle size ranging from about 10 to about 30 microns, and an alkaline earth-zeolite having an average particle size ranging from about 0.1 to about 0.3 microns, and wherein the zeolite comprises a Y type zeolite.

18. A non-precious metal $NO_x$ catalyst combination for treating a lean exhaust gas stream comprising an alkaline earth-alumina catalyst and an alkaline earth-zeolite catalyst arranged on a substrate such that the gas stream first contacts the alkaline earth-alumina catalyst prior to contacting the alkaline earth-zeolite catalyst; wherein the catalyst combination comprises an admixture of an alkaline earth-alumina having an average particle size ranging from about 10 to about 30 microns, and an alkaline earth-zeolite having an average particle size ranging from about 0.1 to about 0.3 micron;, and wherein the zeolite has a surface area of at least about 300 $m^2/g$.

19. A non-precious metal $NO_x$ catalyst combination for treating a lean exhaust gas stream comprising an alkaline earth-alumina catalyst and an alkaline earth-zeolite catalyst arranged on a substrate such that the gas stream first contacts the alkaline earth-alumina catalyst prior to contacting the alkaline earth-zeolite catalyst; wherein the catalyst combination comprises an admixture of an alkaline earth-alumina having an average particle size ranging from about 10 to about 30 microns, and an alkaline earth-zeolite having an average particle size ranging from about 0.1 to about 0.3 microns, wherein the zeolite has average pore sizes ranging from about 4 to 10 angstroms.

* * * * *